US012380914B2

(12) United States Patent
Jang et al.

(10) Patent No.: US 12,380,914 B2
(45) **Date of Patent: *Aug. 5, 2025**

(54) DISPLAY APPARATUS, VOICE ACQUIRING APPARATUS AND VOICE RECOGNITION METHOD THEREOF

(71) Applicant: SAMSUNG ELECTRONICS CO., LTD., Suwon-si (KR)

(72) Inventors: Jong-hyuk Jang, Gunpo-si (KR); Chan-hee Choi, Seoul (KR); Hee-seob Ryu, Hwaseong-si (KR); Kyung-mi Park, Suwon-si (KR); Seung-kwon Park, Yongin-si (KR); Jae-hyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

This patent is subject to a terminal disclaimer.

(21) Appl. No.: 18/068,935

(22) Filed: Dec. 20, 2022

(65) Prior Publication Data

US 2023/0121055 A1 Apr. 20, 2023

Related U.S. Application Data

(63) Continuation of application No. 17/871,576, filed on Jul. 22, 2022, which is a continuation of application (Continued)

(30) Foreign Application Priority Data

Nov. 9, 2012 (KR) ........................ 10-2012-0126650

(51) Int. Cl.
*G10L 15/22* (2006.01)
*G10L 15/30* (2013.01)
(Continued)

(52) U.S. Cl.
CPC .............. *G10L 21/06* (2013.01); *G10L 15/22* (2013.01); *G10L 15/30* (2013.01); *H04L 12/282* (2013.01);
(Continued)

(58) Field of Classification Search
CPC ......... G10L 15/00; G10L 15/30; G10L 15/22; G10L 15/26; G10L 2015/221;
(Continued)

(56) References Cited

U.S. PATENT DOCUMENTS 5,752,232 A 5/1998 Basore et al.
6,070,139 A 5/2000 Miyazawa et al.
(Continued)

FOREIGN PATENT DOCUMENTS

CN 1223508 A 7/1999
CN 1342308 A 3/2002
(Continued)

OTHER PUBLICATIONS

Office Action issued Apr. 28, 2023 by the Korean Patent Office in corresponding KR Patent Application No. 10-2023-0016144.
(Continued)

*Primary Examiner* — Vijay B Chawan
(74) *Attorney, Agent, or Firm* — Sughrue Mion, PLLC

(57) ABSTRACT

Disclosed are a display apparatus, a voice acquiring apparatus and a voice recognition method thereof, the display apparatus including: a display unit which displays an image; a communication unit which communicates with a plurality of external apparatuses; and a controller which includes a voice recognition engine to recognize a user's voice, receives a voice signal from a voice acquiring unit, and controls the communication unit to receive candidate instruction words from at least one of the plurality of external apparatuses to recognize the received voice signal.

20 Claims, 8 Drawing Sheets

Related U.S. Application Data

No. 16/790,237, filed on Feb. 13, 2020, now Pat. No. 11,727,951, which is a continuation of application No. 15/671,178, filed on Aug. 8, 2017, now Pat. No. 10,586,554, which is a continuation of application No. 14/076,361, filed on Nov. 11, 2013, now Pat. No. 10,043,537.

(51) Int. Cl.

*G10L 21/06* (2013.01)
*H04L 12/28* (2006.01)
*H04N 21/41* (2011.01)
*H04N 21/422* (2011.01)
*H04N 21/436* (2011.01)
*H04N 21/485* (2011.01)

(52) U.S. Cl.

CPC ... *H04N 21/41265* (2020.08); *H04N 21/4131* (2013.01); *H04N 21/42203* (2013.01); *H04N 21/43615* (2013.01); *H04N 21/485* (2013.01); *G10L 2015/221* (2013.01)

(58) Field of Classification Search

CPC ............... G10L 2015/223; G10L 21/06; G10L 2015/228; G10L 15/1822
USPC .......................................................... 704/249
See application file for complete search history.

(56) References Cited

U.S. PATENT DOCUMENTS 6,188,985 B1 2/2001 Thrift et al.
6,397,186 B1 5/2002 Bush et al.
6,477,497 B1 11/2002 Aizawa et al.
6,535,854 B2 3/2003 Buchner et al.
6,556,970 B1 4/2003 Sasaki et al.
6,615,177 B1 9/2003 Rapp et al.
6,993,486 B2* 1/2006 Shimakawa ............. H04Q 9/00 704/E15.044
7,801,730 B1 9/2010 Miyazaki et al.
8,260,618 B2 9/2012 Mahlbacher
8,271,287 B1 9/2012 Kermani
10,043,537 B2* 8/2018 Jang ........................ G10L 15/30
10,555,041 B2* 2/2020 Sim .......................... H04N 5/60
10,586,554 B2* 3/2020 Jang ........................ G10L 15/30
10,802,851 B2* 10/2020 Kim ...................... G06F 3/0481
11,727,951 B2* 8/2023 Jang ...................... H04L 12/282 704/249
2002/0013710 A1 1/2002 Shimakawa
2002/0071577 A1 6/2002 Lemay et al.
2002/0072912 A1* 6/2002 Yen ........................ G10L 15/22 704/E15.045
2002/0161572 A1* 10/2002 Kusumoto ....... H04N 21/42203 348/E5.103
2002/0174213 A1 11/2002 Ibaraki
2003/0061033 A1 3/2003 Dishert
2003/0177012 A1 9/2003 Drennan
2003/0182132 A1 9/2003 Niemoeller
2003/0185358 A1 10/2003 Sakamoto
2003/0187659 A1 10/2003 Cho et al.
2004/0010409 A1* 1/2004 Ushida .................... G10L 15/30 704/E15.047
2004/0083103 A1 4/2004 Mozer et al.
2004/0117179 A1 6/2004 Balasuriya
2005/0256370 A1 11/2005 Fujita
2006/0004743 A1 1/2006 Murao et al.
2006/0047473 A1 3/2006 Picciotto et al.
2006/0074658 A1 4/2006 Chadha
2006/0106614 A1 5/2006 Mowatt et al.
2007/0299670 A1 12/2007 Chang
2008/0037727 A1 2/2008 Sivertsen et al.
2008/0059195 A1 3/2008 Brown
2008/0097759 A1 4/2008 Shin
2008/0167868 A1 7/2008 Kanevsky et al.
2009/0018830 A1 1/2009 Emmanuel
2009/0058708 A1 3/2009 Park et al.
2009/0099836 A1 4/2009 Jacobsen et al.
2009/0204410 A1 8/2009 Mozer et al.
2009/0248413 A1 10/2009 Liu et al.
2009/0319276 A1 12/2009 Chang et al.
2010/0010813 A1 1/2010 Harada
2010/0088100 A1 4/2010 Lindahl
2010/0332236 A1* 12/2010 Tan ......................... G10L 15/26 704/E11.001
2011/0050478 A1 3/2011 Choi et al.
2011/0067059 A1 3/2011 Johnston et al.
2011/0093261 A1 4/2011 Angott
2011/0119715 A1 5/2011 Chang et al.
2011/0153323 A1 6/2011 Kim et al.
2011/0161075 A1 6/2011 Hon-Anderson
2011/0246902 A1 10/2011 Tsai et al.
2011/0286600 A1 11/2011 Gosior et al.
2012/0078635 A1* 3/2012 Rothkopf ................ G10L 15/30 704/270.1
2012/0173238 A1 7/2012 Mickelsen et al.
2013/0027613 A1 1/2013 Kim et al.
2013/0073293 A1* 3/2013 Jang ........................ G10L 15/22 704/E21.001
2013/0144618 A1 6/2013 Sun et al.
2013/0278719 A1* 10/2013 Rusert ..................... G06T 7/596 348/43
2013/0297319 A1 11/2013 Kim
2014/0074472 A1* 3/2014 Lin ........................ G08C 17/02 704/E15.001
2014/0122087 A1 5/2014 Macho
2014/0136205 A1 5/2014 Jang et al.
2015/0088518 A1 3/2015 Kim et al.
2022/0358949 A1* 11/2022 Jang ................... H04N 21/4131
2023/0121055 A1* 4/2023 Jang ................. H04N 21/42203 704/249

FOREIGN PATENT DOCUMENTS

CN 1386264 A 12/2002
CN 1437377 A 8/2003
CN 2620913 Y 6/2004
CN 1713271 A 12/2005
CN 1723487 A 1/2006
CN 1725902 A 1/2006
CN 1975799 A 6/2007
CN 101625864 A 1/2010
CN 101778198 A 7/2010
CN 102196207 A 9/2011
CN 102255780 A 11/2011
CN 202033897 U 11/2011
EP 1045374 A1 10/2000
EP 1 207 516 A1 5/2002
EP 2 518 722 A2 10/2012
JP 11311996 A 11/1999
JP 2000-200395 A 7/2000
JP 2001-42884 A 2/2001
JP 2001-197379 A 7/2001
JP 2001-296881 A 10/2001
JP 2005-72764 A 3/2005
JP 2006-33795 A 2/2006
JP 2014-96153 A 5/2014
KR 1999-015328 A 3/1999
KR 10-2002-032621 A 5/2002
KR 10-2005-0054399 A 6/2005
KR 10-2006-0042296 A 5/2006
KR 10-2008-0096239 A 10/2008
KR 10-2009-0023943 A 3/2009
KR 1020110028103 A 3/2011
KR 10-2011-0070338 A 6/2011
RU 121608 U1 10/2012

OTHER PUBLICATIONS

Communication dated Nov. 21, 2022 issued by the European Patent Office in counterpart European Patent Application No. 22187072.8.

(56) References Cited

OTHER PUBLICATIONS

Communication dated Nov. 15, 2023, issued by the India Intellectual Property Office in Indian Patent Application No. 4910/DELNP/2015.
Communication dated Oct. 24, 2019 issued by the Korean Intellectual Property Office in counterpart Korean Application No. 10-2012-0126650.
Communication dated Dec. 18, 2019 issued by the Korean Intellectual Property Office in counterpart Korean Application No. 10-2012-0126650.
Communication dated Mar. 15, 2019, issued by the USPTO in counterpart U.S. Appl. No. 15/489,101.
Communication dated Apr. 3, 2019, issued by the State Intellectual Property Office of P.R. China in counterpart Chinese Application No. 201510276510.6.
Communication dated May 13, 2019, issued by the State Intellectual Property Office of P.R. China in counterpart Chinese Application No. 201310553280.4.
Zhengming MA, "Guide to The Exam for Network Engineering, elaboration on key points, Example questions, Intensive exercises", Metallurgical Industry Press Co., Ltd., Feb. 28, 2005, pp. 23-24 (3 pages total).
Communication dated Aug. 22, 2019, issued by the USPTO in counterpart U.S. Appl. No. 15/489,101.
Communication dated Jul. 2, 2019, from the State Intellectual Property Office of People's Republic of China in counterpart Application No. 201510276510.6.
Communication dated Jul. 19, 2019, from the European Patent Office in counterpart European Application No. 18159291.6.
Communication dated Jul. 16, 2019, from the Japanese Patent Office in counterpart application No. 2015-178839.
Communication dated Dec. 10, 2018, issued by the European Patent Office in counterpart European Application No. 18159291.6.
Communication dated Sep. 10, 2018 issued by the United States Patent Office in Counterpart U.S. Appl. No. 15/489,101.
Communication dated Nov. 23, 2018 issued by the State Intellectual Property Office of P.R. China in Counterpart Chinese Application No. 201310553280.4.
Communication dated Mar. 21, 2018 issued by the State Intellectual Property Office of P.R. China in counterpart Chinese Patent Application No. 201310553280.4.
Communication dated Mar. 27, 2018 issued by the State Intellectual Property Office of P.R. China in counterpart Chinese Patent Application No. 201510276510.6.
Communication dated Mar. 27, 2018 issued by the Japanese Patent Office in counterpart Japanese Patent Application No. 2015-178839.
Communication dated Apr. 9, 2018 issued by the European Patent Office in counterpart European Patent Application No. 18159291.6.
Communication dated Apr. 24, 2018 issued by the Korean Intellectual Property Office in counterpart Korean Patent Application No. 10-2012-0045617.
Communication dated May 8, 2018 issued by the United States Patent and Trademark Office in counterpart U.S. Appl. No. 15/489,101.
Communication issued Dec. 15, 2016 issued by the United states Patent and Trademark Office in counterpart United States U.S. Appl. No. 13/781,819.
Communication issued Dec. 22, 2016, issued by the European Patent Office in counterpart European Patent Application No. 13191285.9.
Communication from United States Patent and Trademark Office issued May 12, 2016, in U.S. Appl. No. 13/781,819.
Communication dated Jan. 15, 2016, issued by the United States Patent and Trademark Office in counterpart U.S. Appl. No. 13/781,819.
Communication dated Feb. 15, 2016, issued by the European Patent Office in counterpart European Application No. 13191285.9.
Communication dated Jul. 13, 2015 issued by United States Patent and Trademark Office in counterpart United States U.S. Appl. No. 13/781,819.
Communication dated May 1, 2015 issued by Japanese Patent Office in counterpart Japanese Patent Application No. 2013-231944.
Communication dated May 4, 2015 issued by European Patent Office in counterpart European Application No. 13191285.9.
Communication dated Oct. 28, 2014, issued by the Japanese Intellectual Property Office in counterpart Japanese Application No. 2013-231944.
Communication dated Jan. 28, 2014, issued by the European Patent Office in counterpart European Patent Application No. 13191285.9.
International Search Report (PCT/ISA/210), dated Mar. 3, 2014, issued by the International Searching Authority in counterpart International Patent Application No. PCT/KR2013/009880.
Communication issued Oct. 27, 2017, issued by the Federal Service for Intellectual Property in counterpart Russian Patent Application No. 2015121906.
Communication issued Nov. 3, 2017, issued by the European Patent Office in counterpart European Patent Application No. 13191285.9.
Communication issued Jul. 4, 2017, issued by the State Intellectual Property Office of the People's Republic of China in counterpart Chinese Patent Application No. 201510276510.6.
Communication issued Sep. 19, 2017, issued by the Japanese Patent Office in counterpart Japanese Patent Application No. 2015-178839.
Communication from United States Patent and Trademark Office issued Oct. 13, 2017, in U.S. Appl. No. 14/076,361.
Communication issued Apr. 30, 2019, issued by the Korean Intellectual Property Office in counterpart Korean Patent Application No. 10-2012-0126650.
Communication dated Sep. 10, 2018 issued by the United States Patent Office in Counterpart U.S. Appl. No. 15/671,178.
Communication dated Mar. 14, 2019 issued by the United States Patent Office in Counterpart U.S. Appl. No. 15/671,178.
Communication dated Jun. 14, 2019 issued by the United States Patent Office in Counterpart U.S. Appl. No. 15/671,178.
Communication dated May 26, 2020 issued by the Indian Patent Office in Indian Counterpart Application No. 4910/DELNP/2015.
Communication dated Jun. 2, 2020 issued by the European Intellectual Property Office in counterpart European Application No. 18 159 291.6.
Communication dated May 26, 2020 issued by the European Intellectual Property Office in counterpart European Application No. 18 159 291.6.
Communication dated Apr. 7, 2020 issued by the State Intellectual Property Office of P.R. China in counterpart Chinese Application No. 201510276510.6.
Communication dated Jun. 18, 2020 issued by the United States Patent Office in counterpart U.S. Appl. No. 15/489,101.
Communication dated Jun. 29, 2020 issued by the Korean Intellectual Property Office in counterpart Korean Application No. 10-2012-0126650.
Communication dated Jul. 13, 2020 issued by the State Intellectual Property Office of P.R. China in counterpart Chinese Application No. 201510276510.6.
Communication dated Jan. 29, 2021, issued by the European Patent Office in application No. 20202566.4.
Communication dated Feb. 23, 2021, issued by the State Intellectual Property Office of P.R. China in counterpart Chinese Application No. 201510276510.6.
Communication dated Feb. 26, 2021 issued by the Korean Patent Office in application No. 10-2020-0094662.
Communication issued Feb. 26, 2024 by the European Patent Office in European Patent Application No. 20202566.4.
Communication issued Feb. 10, 2025 by the European Patent Office for EP Patent Application No. 22187072.8.
Office Action issued Feb. 27, 2025 by the Korean Patent Office for KR Patent Application No. 10-2024-0027667.

* cited by examiner

DISPLAY APPARATUS, VOICE ACQUIRING APPARATUS AND VOICE RECOGNITION METHOD THEREOF

CROSS-REFERENCE TO RELATED APPLICATIONS

This application is a continuation of U.S. patent application Ser. No. 17/871,576, filed on Jul. 22, 2022, in the U.S. Patent and Trademark Office, which is a continuation of U.S. patent application Ser. No. 16/790,237, filed on Feb. 13, 2020, in the U.S. Patent and Trademark Office, which is a continuation of U.S. patent application Ser. No. 15/671,178, filed on Aug. 8, 2017, in the U.S. Patent and Trademark Office (now U.S. Pat. No. 10,586,554, issued Mar. 10, 2020), which is a continuation of U.S. patent application Ser. No. 14/076,361, filed on Nov. 11, 2013, in the U.S. Patent and Trademark Office (now U.S. Pat. No. 10,043,537, issued Aug. 7, 2018), which claims priority from Korean Patent Application No. 10-2012-0126650, filed on Nov. 9, 2012, in the Korean Intellectual Property Office, the disclosures of which are incorporated herein by reference in their entireties.

BACKGROUND

Field

Apparatuses and methods consistent with the exemplary embodiments relate to a display apparatus, a voice acquiring apparatus and a voice recognition method thereof, and more particularly, to a display apparatus, a voice acquiring apparatus and a voice recognition method thereof which recognizes a user's voice.

Description of the Related Art

A voice recognition function is used in various electronic apparatuses such as a digital television (TV), an air conditioner, a home theater, a personal computer (PC), and a mobile phone, etc.

To perform the voice recognition function, a main apparatus such as a TV should have a microphone to receive a user's voice and a voice recognition engine to recognize the input voice, and the voice recognition engine may compare the input voice with a stored candidate instruction words, and recognize the voice according to a result of comparison.

However, the related art electronic apparatus which has the voice recognition function has a fixed means to receive the user's voice, and thus is difficult to utilize various input means such as a mobile phone inputting voice. Also, if many candidate instruction words are provided, a rate of recognition would be increased, but the electronic apparatus should compare the candidate instruction words, resulting in a slower voice recognition processing speed. Further, as the storage capacity of the main apparatus is limited, the number of the candidate instruction words may not be increased continuously.

SUMMARY

According to an aspect of an exemplary embodiment, there is provided a display apparatus including: a display unit which displays an image thereon; a communication unit which communicates with a plurality of external apparatuses; and a controller which includes a voice recognition engine to recognize a user's voice, receives a voice signal from a voice acquiring unit, and controls the communication unit to receive candidate instruction words from at least one of the plurality of external apparatuses to recognize the received voice signal.

A plurality of voice acquiring units may be provided. If a voice input is detected to at least one of the plurality of voice acquiring units, the controller may receive a voice signal from the voice acquiring unit to which the voice input is detected.

The voice acquiring unit may include at least one of a built-in microphone provided in the display apparatus, a first external microphone provided in at least one of the plurality of external apparatuses, and a second external microphone different from the built-in microphone and the first external microphone.

The external apparatus may include at least one application which may manage the candidate instruction words.

The display apparatus may further include a native application which manages the candidate instruction words.

The display apparatus may further include a storage unit which stores the received candidate instruction words therein, and the voice recognition engine may recognize the received voice by using the stored candidate instruction words.

If the at least one of the plurality of voice acquiring units detects a wakeup keyword, the controller may enable the voice acquiring unit which detects the wakeup keyword, and receive a voice signal from the enabled voice acquiring unit.

If a trigger signal is input by a manipulation of a predetermined button provided in one of the plurality of voice acquiring units, the controller may enable the voice acquiring unit by which the trigger signal is input, and receive a voice signal from the enabled voice acquiring unit.

The controller may control the display unit to display thereon voice recognition results for the voice signal and the candidate instruction words corresponding to the voice recognition results.

The display unit may display thereon information on an application which manages the candidate instruction words.

The voice recognition engine may recognize the voice by deciding an instruction word that is identical to or similar to the received voice signal, among the received candidate instruction words.

According to an aspect of another exemplary embodiment, there is provided a voice acquiring apparatus including: a communication unit which communicates with a display apparatus having a voice recognition function; a voice acquiring unit which receives a user's voice; a voice converter which converts the received voice into an electric voice signal; and a controller which controls the communication unit to transmit the converted voice signal and candidate instruction words to the display apparatus to recognize the voice signal.

The voice acquiring apparatus may further include at least one application which may manage the candidate instruction words.

According to an aspect of another exemplary embodiment, there is provided a voice recognition method of a display apparatus including: receiving a voice signal from a voice acquiring unit; receiving candidate instruction words from at least one of a plurality of external apparatuses to recognize the received voice signal; and recognizing a user's voice according to the received voice signal and the candidate instruction words.

The voice recognition method may further include detecting a voice input to at least one of a plurality of voice acquiring units, and the receiving the voice signal may include receiving the voice signal from the voice acquiring unit to which the voice input is detected.

The voice acquiring unit may include at least one of a built-in microphone provided in the display apparatus, a first external microphone provided in at least one of the plurality of external apparatuses, and a second external microphone provided in an apparatus different from the display apparatus and the plurality of external apparatuses.

The external apparatus may include at least one application which manages the candidate instruction words.

The display apparatus may include a native application which manages the candidate instruction words.

The voice recognition method may further include storing the received candidate instruction words, and the recognizing the voice may include recognizing the voice by using the stored candidate instruction words.

The detecting the voice input may include detecting a wakeup keyword to one of the plurality of voice acquiring units, and enabling the voice acquiring unit that detects the wakeup keyword.

The detecting the voice input may include detecting an input of a trigger signal according to a manipulation of a predetermined button provided in one of the plurality of voice acquiring units, and enabling the voice acquiring unit by which the trigger signal is input.

The voice recognition method may further include displaying voice recognition results for the voice signal and candidate instruction words corresponding to the voice recognition results.

The displaying may include displaying information on an application that manages the candidate instruction words.

The recognizing the voice may include recognizing the voice by deciding an instruction word that is identical to or similar to the received voice signal, among the received candidate instruction words.

BRIEF DESCRIPTION OF THE DRAWINGS

The above and/or other aspects will become apparent and more readily appreciated from the following description of the exemplary embodiments with reference to the accompanying drawings, in which.

DETAILED DESCRIPTION OF EXEMPLARY EMBODIMENTS

Figure 1:
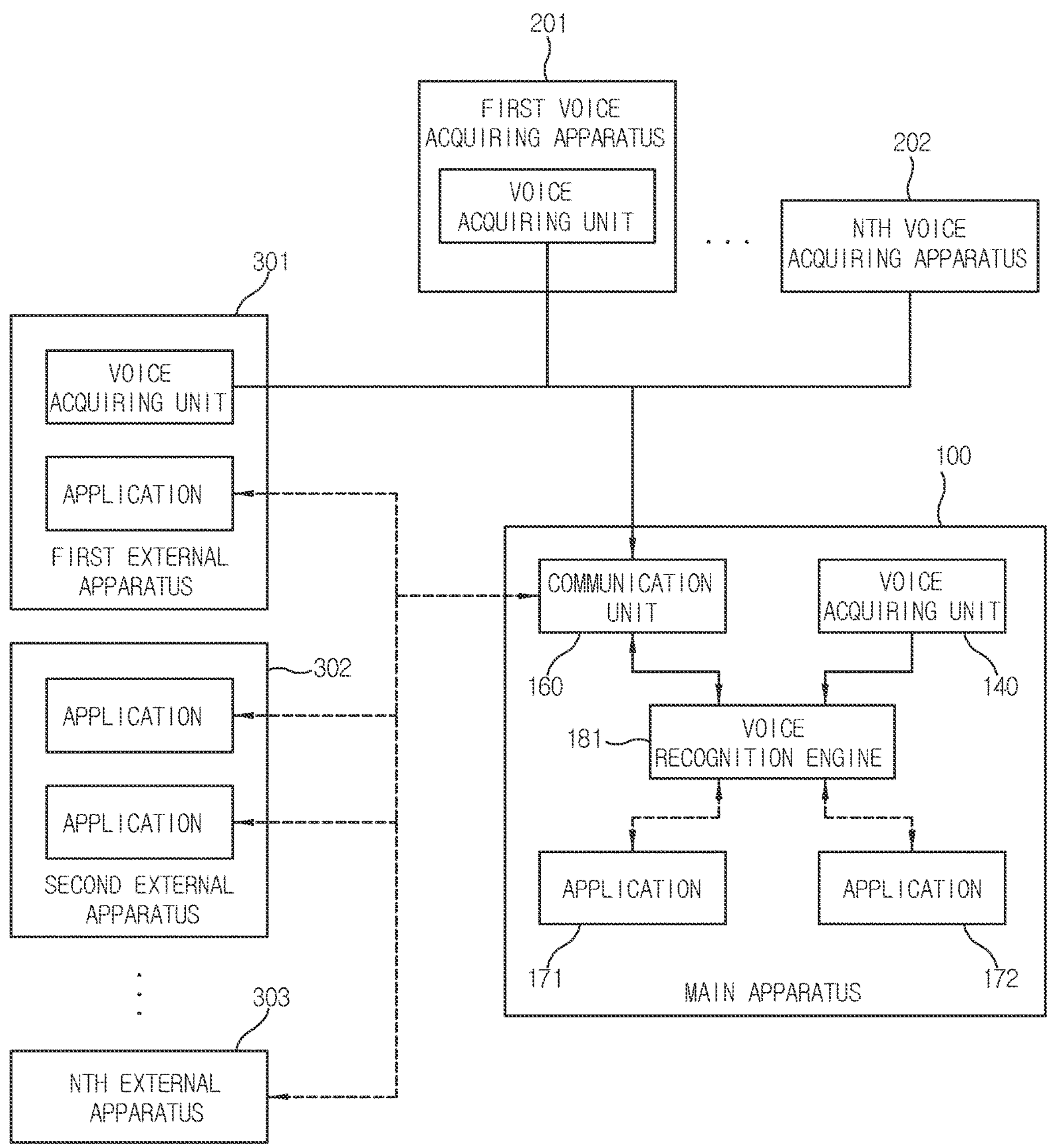
FIG. 1 illustrates an example of a voice recognition system according to an exemplary embodiment.

Below, exemplary embodiments will be described in detail with reference to accompanying drawings. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of a voice recognition system according to an exemplary embodiment.

As shown in FIG. 1, the voice recognition system includes a main apparatus 100, a plurality of voice acquiring apparatuses 201 and 202, and a plurality of external apparatuses 301, 302 and 303. The main apparatus 100, the plurality of voice acquiring apparatuses 201 and 202, and the plurality of external apparatuses 301, 302 and 303 are connected to one another for mutual communication.

The main apparatus 100 includes a voice acquiring unit 140 such as a microphone to receive a user's voice, and a voice recognition engine 181 to recognize the input voice and to communicate with the plurality of voice acquiring apparatuses 201 and 202 and the plurality of external apparatuses 301, 302 and 303 through a communication unit 160. The main apparatus 100 further includes native applications 171 and 172, which are driven for the main apparatus 100 to perform various functions (services). The native applications 171 and 172 store in advance therein candidate instruction words corresponding to the functions. That is, the native applications 171 and 172 are included in available service scenario. The candidate instruction words stored in the native applications 171 and 172 are transmitted to the voice recognition engine 181 at the time of voice recognition to enable the voice recognition engine 181 to perform voice recognition.

Each of the plurality of voice acquiring apparatuses 201 and 202 may include a voice acquiring unit such as a microphone to receive a user's voice, and a voice signal corresponding to the received voice is transmitted to the main apparatus 100 for voice recognition.

The plurality of voice acquiring apparatuses 201 and 202 may receive a user's voice, convert the voice into an electric voice signal, and transmit the electric voice signal to the main apparatus 100. The plurality of voice acquiring apparatuses 201 and 202 may perform a wireless communication with the main apparatus 100. While not limited thereto, the wireless communication includes a wireless LAN, a radio frequency (RF) communication, a Bluetooth, Zigbee, an infrared (IR) communication, etc.

The plurality of external apparatuses 301, 302 and 303 may include at least one dev. Application to perform functions (services) as needed. The dev. Application stores in advance therein candidate instruction words corresponding to the functions performed by the external apparatuses 301, 302 and 303. The candidate instruction words commands stored in the dev. Application are transmitted to the voice recognition engine 181 at the time of voice recognition to enable the voice recognition engine 181 to perform voice recognition.

The candidate instruction words that are stored in the native applications 171 and 172 and in the dev. Application in advance may be instruction words related to functions/operations of the applications. For example, if the main apparatus 100 is a TV, candidate instruction words related to a change of channel, an adjustment of volume, etc. of the TV may be stored in one of the native applications 171 and 172. If the external apparatus 302 is an air conditioner, candidate instruction words related to an adjustment of temperature (up/down), an adjustment of intensity of wind (strong/weak/moderate), etc. of the air conditioner may be stored in the application included in the external apparatus 302.

The external apparatus or the voice acquiring apparatus may include both the voice acquiring unit and the dev.

application. In this case, if a voice is input to the voice acquiring unit in the first external apparatus 301, the candidate instruction words stored in advance in the dev. application of the first external apparatus 301 are transmitted to the voice recognition engine 181 of the main apparatus 100 to perform voice recognition.

The voice recognition system according to the exemplary embodiment includes at least one voice acquiring unit. If the voice input to the voice acquiring unit is detected, the voice recognition system receives a voice stream by enabling the voice acquiring unit to which the voice input has been detected. If a plurality of voice acquiring units is provided, the voice recognition system may receive the voice stream by enabling the voice acquiring unit to which the voice input has been detected, among the plurality of voice acquiring units. The plurality of voice acquiring units may include a built-in microphone provided in the main apparatus 100, a first external microphone provided in at least one of the plurality of external apparatuses 301, 302 and 303, and a second external microphone provided in the voice acquiring apparatuses 201 and 202 which are different from the main apparatus 100 and the plurality of external apparatuses 301, 302 and 303. The voice acquiring apparatuses 201 and 202 are separated from the main apparatus 100 and the plurality of external apparatuses 301, 302 and 303.

If the at least one of the plurality of voice acquiring units detects a wakeup keyword, the main apparatus 100 may enable the voice acquiring unit by which the wakeup keyword is detected, and receive a voice signal from the enabled voice acquiring unit. If a trigger signal is input by a manipulation of a predetermined button (e.g., an occurrence of an event) in the at least one of the plurality of voice acquiring units, the main apparatus 100 may enable the voice acquiring unit by which the input trigger signal is input and receive the voice signal from the enabled voice acquiring unit.

The main apparatus 100 may operate in a voice recognition mode. If the at least one voice acquiring unit is enabled by the wakeup keyword or the trigger signal, the main apparatus 100 may disable other voice acquiring units to prevent an occurrence of error in voice recognition. The main apparatus 100 may operate in a distant or adjacent voice recognition mode. The main apparatus 100 may display a user interface (UI) showing the voice acquiring unit connected to a display unit 130 (to be described later) for user's convenience.

The main apparatus 100 may receive candidate instruction words from the at least one of the plurality of external apparatuses 301, 302 and 303 to recognize the received voice signal. The received candidate instruction words may be transmitted to the voice recognition engine 181 for voice recognition.

The plurality of external apparatuses 301, 302 and 303 include at least one application which manages the candidate instruction words. The main apparatus 100 includes native applications 171 and 172, which manage the candidate instruction words. The candidate instruction words managed by the native applications 171 and 172 may be transmitted to the voice recognition engine 181 for voice recognition.

Figure 2:
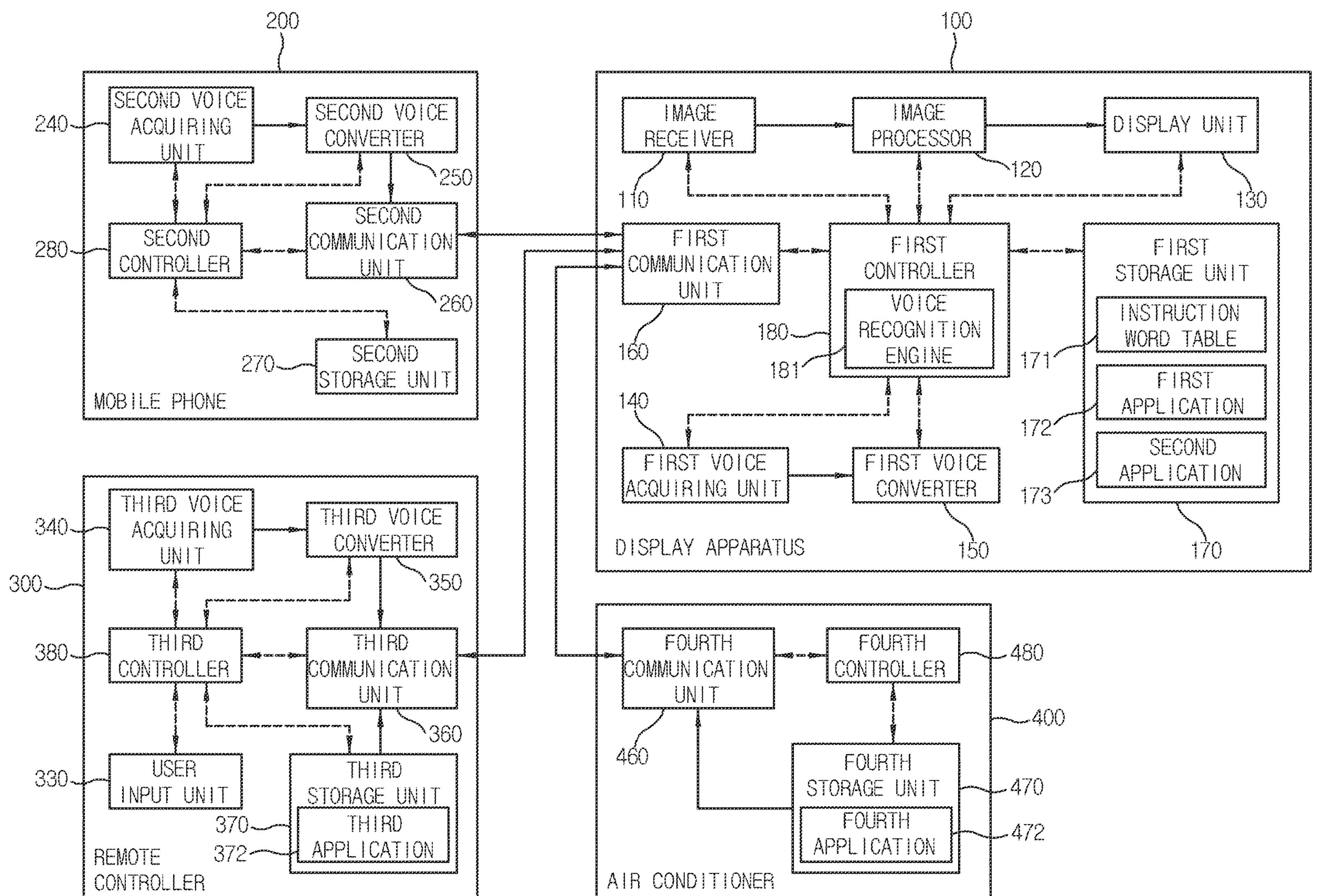
FIG. 2 is a block diagram of the voice recognition system according to an exemplary embodiment.

The main apparatus 100 may be implemented as a display apparatus such as a television (TV) as in FIG. 2.

FIG. 2 is a block diagram of the voice recognition system according to an exemplary embodiment.

The display apparatus 100 processes an image signal from an external image supply source (not shown) to display an image based on the processed image signal.

In the voice recognition system according to the exemplary embodiment, the display apparatus 100 is implemented as the TV or a set-top box which processes a broadcasting image based on broadcasting signals/broadcasting information/broadcasting data transmitted from a broadcasting station. However, it is understood that in one or more other exemplary embodiments, the display apparatus 100 may apply to various other devices which process and display an image, in addition to the TV or the set-top box. For example, the display apparatus 100 may include a personal computer (PC), a laptop computer, etc.

Further, it is understood that the type of an image which is displayable by the display apparatus 100 is not limited to the broadcasting image. For example, the display apparatus 100 may display, e.g., a video, a still image, applications, an on screen display (OSD), a graphic user interface (GUI) to control various operations, based on signals/data transmitted by various image supply sources (not shown).

According to an exemplary embodiment, the display apparatus 100 may be implemented as a smart TV. The smart TV may receive and display a broadcasting signal in real-time, have a web browser function to display the broadcasting signal in real-time and to search various contents through an Internet, and provide a convenient user environment to do the foregoing. The smart TV may include an open software platform to provide a user with an interactive service, and may provide the user with various contents through the open software platform, e.g., an application providing a predetermined service. The application may provide various types of services, e.g., SNS, finance, news, weather, maps, music, movies, games, e-books, etc.

The display apparatus 100 includes the voice recognition engine 181 to recognize a user's voice. A command corresponding to the recognized voice, e.g. a control command, is transmitted to a corresponding application to perform the operation. If the application corresponding to the control command is one of the native applications 171 and 172, the display apparatus 100 performs an operation according to the control command by the application. If the application corresponding to the control command is a dev. application, the control command is transmitted to the external apparatuses 301, 302 and 303 including the dev. Application. The external apparatuses 301, 302 and 303 may perform an operation according to the control command by the application.

Referring to FIG. 2, a plurality of the voice acquiring apparatus is provided, e.g. a mobile phone 200 and a remote controller 300. The remote controller 300 may act as both the voice acquiring apparatus and the external apparatus. The mobile phone 200 may be a smart phone having a voice acquiring function.

The remote controller 300 may transmit a preset command (control command) to a corresponding apparatus by a user's manipulation. The remote controller 300 may be set to transmit a command to the display apparatus 100 or to the external apparatus, and may be implemented as an integrated remote controller transmitting the command to a plurality of apparatuses. The remote controller 300 may include a TV remote controller and/or an air conditioner remote controller.

The voice acquiring apparatus may be implemented as various apparatuses which receive a user's voice, e.g., a mobile handset, a microphone transmitter, etc.

As shown in FIG. 2, a plurality of the external apparatuses is provided, e.g. the remote controller 300 and the air conditioner 400. As described above, the remote controller 300 may act as both the voice acquiring apparatus and the external apparatus.

Although FIG. 2 illustrates the external apparatuses of the remote controller 300 and the air conditioner 400, the exemplary embodiment is not limited thereto. For example, the external apparatuses may be implemented as other various electronic devices which perform wireless communication, e.g., as a home theater, a radio, VCR, DVD, a washing machine, a refrigerator, a robot vacuum cleaner, etc. If the external apparatus includes a voice acquiring unit such as a microphone, the external apparatus may also act as a voice acquiring apparatus.

The external apparatuses according to the exemplary embodiment include applications 372 and 472 respectively to perform functions. The applications 372 and 472 store in advance candidate instruction words, and manage the candidate instruction words. The candidate instruction words may be transmitted to the display apparatus 100 for voice recognition.

The external apparatuses, i.e. the remote controller 300 and the air conditioner 400, may perform operations corresponding to the control command transmitted by the display apparatus 100 according to a result of the voice recognition.

Hereinafter, referring to FIG. 2, each element of the voice recognition system will be described in detail.

The display apparatus 100 may include an image receiver 110 which receives an image signal, an image processor 120 which processes the image signal received from the image receiver 110, a display unit 130 which displays an image based on the image signal processed by the image processor 120, a first voice acquiring unit 140 which receives a user's voice, a first voice converter 150 which converts the received voice into an electric voice signal, a first communication unit 160 which communicates with the external apparatus, a first storage unit 170 which stores various data, and a first controller 180 which controls the display apparatus 100.

The image receiver 110 receives an image signal and transmits the image signal to the image processor 120. For example, the image receiver 110 may receive a radio frequency (RF) signal in a wireless manner from a broadcasting station (not shown), or receive image signals in a wired manner according to standards such as composite video, component video, super video, SCART (Syndicat des Constructeurs d'Appareils Radiorécepteurs et Téléviseurs,—Radio and Television Receiver Manufacturers' Association), high definition multimedia interface (HDMI), etc. If the image signal includes a broadcasting signal, the image receiver 110 includes a tuner to tune the broadcasting signal by channel.

The image signal may be received from the external apparatus, e.g., a PC, an AV device, a smart phone, a smart pad, etc. The image signal may be data transmitted through a network such as the Internet. In this case, the display apparatus 100 may perform a network communication through the first communication unit 160, and may include an additional network communication unit. Alternatively, the image signal may be data stored in the first storage unit 170, e.g., a flash memory, hard disc drive (HDD), etc. The first storage unit 170 may be provided within/outside the display apparatus 100. If the first storage unit 170 is provided outside the display apparatus 100, the display apparatus 100 may include a connector (not shown) to which the first storage unit 170 is connected.

The image processor 120 performs various image processing operations with respect the image signal, and outputs the processed image signal to the display unit 130.

The image processing operations of the image processor 120 may include, but not limited thereto, a decoding operation corresponding to various image formats, a de-interlacing operation, a frame refresh rate conversion, a scaling operation, a noise reduction operation for improving an image quality, a detail enhancement operation, a line scanning operation, etc. The image processor 120 may be implemented as individual groups which independently perform the foregoing operations, or as a system-on-chip (SoC) which performs integrated functions.

The display unit 130 displays an image based on the image signal processed by the image processor 120. The display unit 130 may include, but is not limited thereto, a liquid crystal display (LCD), a plasma display panel (PDP), a light emitting diode (LED), an organic light emitting diode (OLED), a surface-conduction electron-emitter, a carbon nano-tube, a nano-crystal, etc.

The display unit 130 may include additional elements depending on its embodiment type. For example, the display unit 130 as an LCD type includes an LCD panel (not shown), a backlight unit (not shown) emitting light to the LCD panel, and a panel driving substrate (not shown) to drive the LCD panel.

The display unit 130 may display voice recognition results as information on the recognized voice. The voice recognition results may be displayed in various forms such as texts, graphics, icons, etc. Texts include characters and numbers. The display unit 130 may further display candidate instruction words according to the voice recognition results and application information. This will be described in more detail later with reference to FIG. 4.

A user may check whether the voice has been correctly recognized, based on the voice recognition results displayed on the display unit 130. The user may manipulate a user input unit 330 in the remote controller 300 to select an instruction word corresponding to a user's voice from the displayed candidate instruction words, or may select and check information related to the voice recognition results.

The first voice acquiring unit 140 receives a user's voice, and may be implemented as a microphone.

The first voice converter 150 converts the voice input by the first voice acquiring unit 140 into an electric voice signal. The converted voice signal may be in a pulse code modulation (PCM) or in a compressed audio waveform. The first voice converter 150 may be implemented as an A/D converter which converts the user's voice into a digital form.

If the first voice acquiring unit 140 is a digital microphone, it does not require an additional A/D conversion. In this case, the first voice acquiring unit 140 may include the first voice converter 150.

The first communication unit 160 communicates with the voice acquiring apparatus and external apparatus, i.e., with the mobile phone 200, the remote controller 300, and the air conditioner 400. The first communication unit 160 may perform a wireless communication, which includes at least one of infrared communication, RF, Zigbee, and Bluetooth.

The first storage unit 170 stores data by a control of the first controller 180. The first storage unit 170 is implemented as a non-volatile storage medium such as a flash memory, a hard disc drive (HDD), etc. The first storage unit 170 is accessed by the first controller 180, which reads/writes/modifies/deletes/updates data.

The data stored in the first storage unit 170 includes, e.g., an operating system (OS) for driving the display apparatus 100, various applications executed on the OS, image data, and additional data, etc.

The first storage unit 170 may store various data to recognize a user's voice. For example, the first storage unit 170 may store an instruction word table 171 including candidate instruction words (hereinafter, to be also called candidate instruction word group), as recognized voice information corresponding to the received voice signal. In the instruction word table 171, candidate instruction words may be managed by a corresponding application.

The first storage unit 170 may further store at least one application, e.g., first and second applications 172 and 173 to perform functions of the display apparatus 100. The first and second applications 172 and 173 are driven by a control of the first controller 180 (to be described later), and perform various functions of the display apparatus 100. Although FIG. 2 illustrates the display apparatus 100 in which two applications 172 and 173 are installed, the exemplary embodiments are not limited thereto. That is, three or more applications may be installed in the display apparatus 100.

The first and second applications 172 and 173 may manage candidate instruction words corresponding to performed functions. The candidate instruction words which are managed by the first and second applications 172 and 173 may be registered with/deleted from the instruction word table 171.

If the candidate instruction words are registered with the instruction word table 171, the voice recognition engine 181 performs voice recognition by using the candidate instruction words in the instruction word table 171.

The candidate instruction words which may be registered with/deleted from the instruction word table 171 may include candidate instruction words managed by a third application 372 of the remote controller 300 (to be described later) and candidate instruction words managed by a fourth application 472 of the air conditioner 400.

The first controller 180 controls various elements of the display apparatus 100. For example, the first controller 180 controls the image processor 120 to process an image signal, and performs a control operation in response to a command from the remote controller 300 to control overall operations of the display apparatus 100.

The first controller 180 may be implemented, e.g., as a central processing unit (CPU) combined with software.

The first controller 180 may include the voice recognition engine 181 to recognize a user's voice. A voice recognition function of the voice recognition engine 181 may be performed by using a known voice recognition algorithm. For example, the voice recognition engine 181 extracts voice characteristic vector of the voice signal, and compares the extracted voice characteristic vector with the candidate instruction words stored in the instruction word table 171 of the first storage unit 170 to recognize voice. If there is no candidate instruction words stored in the instruction word table 171 which is identical to the voice characteristic vector, the voice recognition engine 181 may recognize the voice by adjusting the voice recognition results with the most similar instruction word. If there is a plurality of similar candidate instruction words, the first controller 180 may display the plurality of candidate instruction words on the display unit 130 for the user to select one of the plurality of candidate instruction words.

While not restricted thereto, the voice recognition engine 181 according to the exemplary embodiment is implemented as an embedded voice recognition engine 181 provided in the CPU. For example, the voice recognition engine 181 may be implemented as an apparatus provided in the display apparatus 100 separately from the CPU, i.e., implemented as an additional chip such as a microcomputer.

While not restricted thereto, the exemplary embodiment includes the voice recognition engine 181 which is provided in a server that is separated from the display apparatus 100 (hereinafter, to be called a cloud server (not shown)). The cloud server communicates with the display apparatus 100 through a network such as the Internet. The network may be a wired or wireless network. In this case, the voice recognition engine 181 may be implemented as an embedded voice recognition engine provided in a CPU of the cloud server, or as an apparatus provided in the cloud server separately from the CPU, i.e., as an additional chip such as a microcomputer.

The first controller 180 may perform an operation corresponding to a recognition result of the voice recognition engine 181. For example, if the display apparatus 100 is a TV and a user is watching a movie or news, the voice recognition engine 181 may recognize voice such as "volume up", "volume down", "louder", "lower", etc., and the first controller 180 may adjust volume of the movie or news according to the voice.

If the voice recognition engine 181 recognizes the voice for controlling the external apparatus such as the remote controller 300 or the air conditioner 400, the first controller 180 may control the first communication unit 160 to transmit a control command to the external apparatus corresponding to the recognized voice. For example, if the voice recognition engine 181 recognizes a voice of "raise temperature", the first controller 180 may recognize that the voice is for controlling the air conditioner 400, and control the first communication unit 160 to transmit a command to the air conditioner 400 to raise the temperature of the air conditioner 400.

Hereinafter, a detailed configuration of the mobile phone 200 will be described.

As shown in FIG. 2, the mobile phone 200 may include a second voice acquiring unit 240 which receives a user's voice, a second voice converter 250 which converts the received voice into an electric voice signal, a second communication unit 260 which communicates with the outside, a second storage unit 270 which stores data, and a second controller 280 which controls the mobile phone 200.

The second voice acquiring unit 240 which receives the user's voice may be implemented as a microphone. The second voice converter 250 converts the received voice into an electric voice signal. The converted voice signal may be in a pulse code modulation (PCM) or in a compressed audio waveform. The second voice converter 250 may be implemented as an A/D converter which converts the user's input voice into a digital form.

If the second voice acquiring unit 240 is a digital microphone, it does not require an additional A/D conversion. In this case, the second voice acquiring unit 240 may include the second voice converter 240.

The second communication unit 260 which communicates with the display apparatus 100 may perform a wired or wireless communication. The wireless communication may include at least one of RF, Zigbee, and Bluetooth.

The second communication unit 260 may transmit the voice signal from the second voice converter 250 to the display apparatus 100.

The second storage unit 270 may store data by a control of the second controller 280. The second storage unit 270 is implemented as a non-volatile storage medium such as a flash memory. The second storage unit 270 is accessed by the second controller 280, which reads/writes/modifies/deletes/updates data.

The data stored in the second storage unit 270 may include, e.g., an OS for driving the mobile phone 200, various applications executed on the OS, image data, additional data, etc.

The second controller 280 may control various elements of the mobile phone 200. For example, the second controller 280 may generate a command in response to a user's manipulation, perform an operation corresponding to the generated command, and display a result on a display unit (not shown).

The second controller 280 may be implemented as a micro controller unit (MCU) combined with software.

If the user's voice is input through the second voice acquiring unit 240, the second controller 280 controls the second voice converter 250 to convert the user's voice into an electric voice signal and controls the second communication unit 260 to transmit the converted voice signal to the display apparatus 100.

Hereinafter, a detailed configuration of the remote controller 300 will be described.

As shown in FIG. 2, the remote controller 300 as a voice acquiring apparatus and an external apparatus, may include a user input unit 330 which receives a user's manipulation, a third voice acquiring unit 340 which receives a user's voice, a third voice converter 350 which converts the received voice into an electric voice signal, a third communication unit 360 which communicates with the outside, a third storage unit 370 which stores data, and a third controller 280 which controls the remote controller 300.

The user input unit 330 may transmit various control commands or information to the third controller 380 by a user's manipulation and input. The user input unit 330 may be implemented as a menu key, a number key, etc. provided in the remote controller 300. If the remote controller 300 is a TV remote controller, the user input unit 330 may include a touch sensor to receive a user's touch input, and/or a motion sensor to sense a motion of the remote controller 300.

The third voice acquiring unit 340 which receives the user's voice may be implemented as a microphone.

The third voice converter 350 converts the voice input by the third voice acquiring unit 340 into an electric voice signal. The converted voice signal may be in a pulse code modulation (PCM) or in a compressed audio waveform. The third voice converter 350 may be implemented as an A/D converter which converts a user's input voice into a digital form.

If the third voice acquiring unit 340 is a digital microphone, it does not require an additional A/D conversion. In this case, the third voice acquiring unit 340 may include the third voice converter 350.

The third communication unit 360 communicates with the display apparatus 100. The third communication unit 360 performs wireless communication. The wireless communication includes at least one of RF, Zigbee, and Bluetooth.

The third communication unit 360 transmits the voice signal from the third voice converter 350 and the candidate instruction words managed by the third application 372 of the third storage unit 370 (to be described later) to the display apparatus 100.

The third storage unit 370 which stores data by a control of the third controller 380 may be implemented as a non-volatile storage medium such as a flash memory, etc. The third storage unit 370 is accessed by the third controller 380, which reads/writes/modifies/deletes/updates data.

The data stored in the third storage unit 370 may include, e.g., an OS for driving the remote controller 300, various applications executed on the OS, image data, and additional data, etc.

The third storage unit 370 may further store at least one application, e.g., the third application 372 to perform functions of the remote controller 300. The third application 372 is driven by a control of the third controller 380 (to be described later), and performs various functions of the remote controller 300. Here, the third application 372 and a fourth application 472 (to be described later) will be called dev. applications to be distinguished from the native applications 172 and 173 of the display apparatus 100.

Although FIG. 2 illustrates the remote controller 300 in which one application 372 is installed, the exemplary embodiment is not limited thereto. That is, two or more applications may be installed in the remote controller 300.

The third application 372 may manage candidate instruction words corresponding to performed functions. The candidate instruction words managed by the third application 372 may be registered with/deleted from the instruction word table 171 of the display apparatus 100.

The third controller 380 may control various elements of the remote controller 300. For example, the third controller 380 may generate a command in response to the user's manipulation of the user input unit 330, and control the third communication unit 360 to transmit the generated command to the display apparatus 100.

The third controller 380 may be implemented as an MCU combined with software.

If a user's voice is input through the third voice acquiring unit 340, the third controller 380 controls the third voice converter 350 to convert the user's voice into an electric voice signal and controls the third communication unit 360 to transmit the converted voice signal to the display apparatus 100.

While communicating with the display apparatus 100, the third controller 380 may transmit the candidate instruction words managed by the third application 372 of the third storage unit 370 to the display apparatus 100. The transmitted candidate instruction words are registered with the instruction word table 171 of the display apparatus 100 and used to recognize voice by the voice recognition engine 181.

If a control command is transmitted by the display apparatus 100 as a result of the voice recognition, the third controller 380 may receive the control command through the third communication unit 360 and perform an operation corresponding to the received control command.

Hereinafter, a detailed configuration of the air conditioner 400 will be described.

As shown in FIG. 2, the air conditioner 400 as an external apparatus may include a fourth communication unit 460 which communicates with the outside, a fourth storage unit 470 which stores data, and a fourth controller 480 which controls the air conditioner 400.

The fourth communication unit 460 which communicates with the display apparatus 100 may perform wireless communication, which includes at least one of RF, Zigbee, and Bluetooth.

The fourth communication unit 460 transmits candidate instruction words managed by the fourth application 472 of the fourth storage unit 470 (to be described later) to the display apparatus 100.

The fourth storage unit 470 which stores data by a control of the fourth controller 480 may be implemented as a non-volatile storage medium such as a flash memory. The fourth storage unit 470 is accessed by the fourth controller 480, which reads/writes/modifies/deletes/updates data.

The data stored in the fourth storage unit 470 may include, e.g., an OS for driving the air conditioner 400, various applications executed on the OS, image data, and additional data, etc.

The fourth storage unit 470 may further store at least one application (dev. application), e.g., a fourth application 472 to perform functions of the air conditioner 400. The fourth application 472 is driven by a control of the fourth controller 480 (to be described later), and performs various functions of the air conditioner 400.

Although FIG. 2 illustrates the air conditioner 400 in which one application 472 is installed, the exemplary embodiment is not limited thereto. That is, two or more applications may be installed in the air conditioner 400.

The fourth application 472 manages candidate instruction words corresponding to performed functions. The candidate instruction words managed by the fourth application 472 may be registered with/deleted from the instruction word table 171 of the display apparatus 100.

The fourth controller 480 controls various elements of the air conditioner 400. For example, the fourth controller 480 may receive a control command in response to the user's manipulation of a remote controller of the air conditioner 400, and perform a control operation, e.g., adjust temperature, according to the generated control command.

The fourth controller 480 may be implemented as an MCU combined with software.

While communicating with the display apparatus 100, the fourth controller 480 may transmit the candidate instruction words managed by the fourth application 472 of the fourth storage unit 470 to the display apparatus 100. The transmitted candidate instruction words are registered with the instruction word table 171 of the display apparatus 100 and used to recognize voice by the voice recognition engine 181.

If a control command is transmitted by the display apparatus 100 as a result of the voice recognition, the fourth controller 480 may receive the control command through the fourth communication unit 460 and perform an operation corresponding to the received control command.

If a voice input is detected to at least one of the plurality of voice acquiring units 140, 240 and 340, the first controller 180 of the display apparatus 100 as the main apparatus of the voice recognition system according to the exemplary embodiment controls the first communication unit 140 to receive the voice signal from the voice acquiring unit to which the voice input has been detected. The first controller 180 receives the candidate instruction words from at least one of the dev. applications 372 and 472 of the plurality of external apparatuses 300 and 400 through the first communication unit 140 or from the native applications 172 and 173 of the display apparatus 100 to recognize the received voice signal, and registers the transmitted candidate instruction words with the instruction word table 171 of the first storage unit 170. The voice recognition engine 181 compares the candidate instruction words registered with the instruction word table 171 with the voice signal and recognizes the voice.

The display apparatus 100 may detect voice input through various apparatuses which input a user's voice. The display apparatus 100 may use the candidate instruction words which are provided by the application to recognize voice, and may dynamically register/delete the candidate instruction words for voice recognition. Thus, the candidate instruction words of the display apparatus 100 may be prevented from being increased unnecessarily.

The display apparatus 100 may receive the voice recognition from the voice acquiring unit 140, receive candidate instruction words from the at least one of the native applications, 172 and 173 or from the dev. Applications 372 and 472, and perform voice recognition with the voice recognition engine 181.

Hereinafter, the voice recognition system which recognizes voice according to the exemplary embodiment will be described in more detail with reference to FIGS. 3 and 4.

Figure 3:
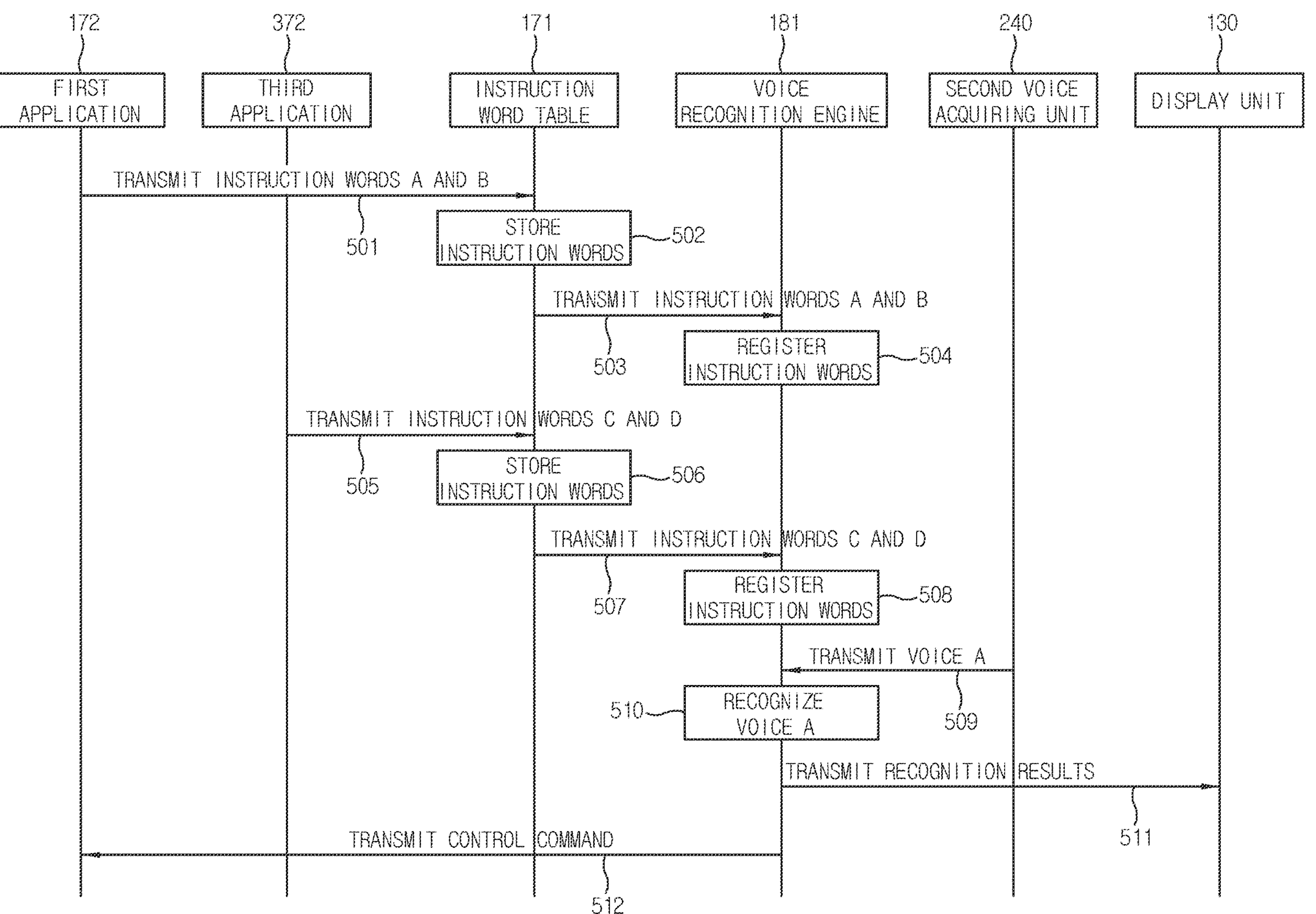
FIG. 3 illustrates an example of performance of voice recognition according to an exemplary embodiment.
Figure 4:
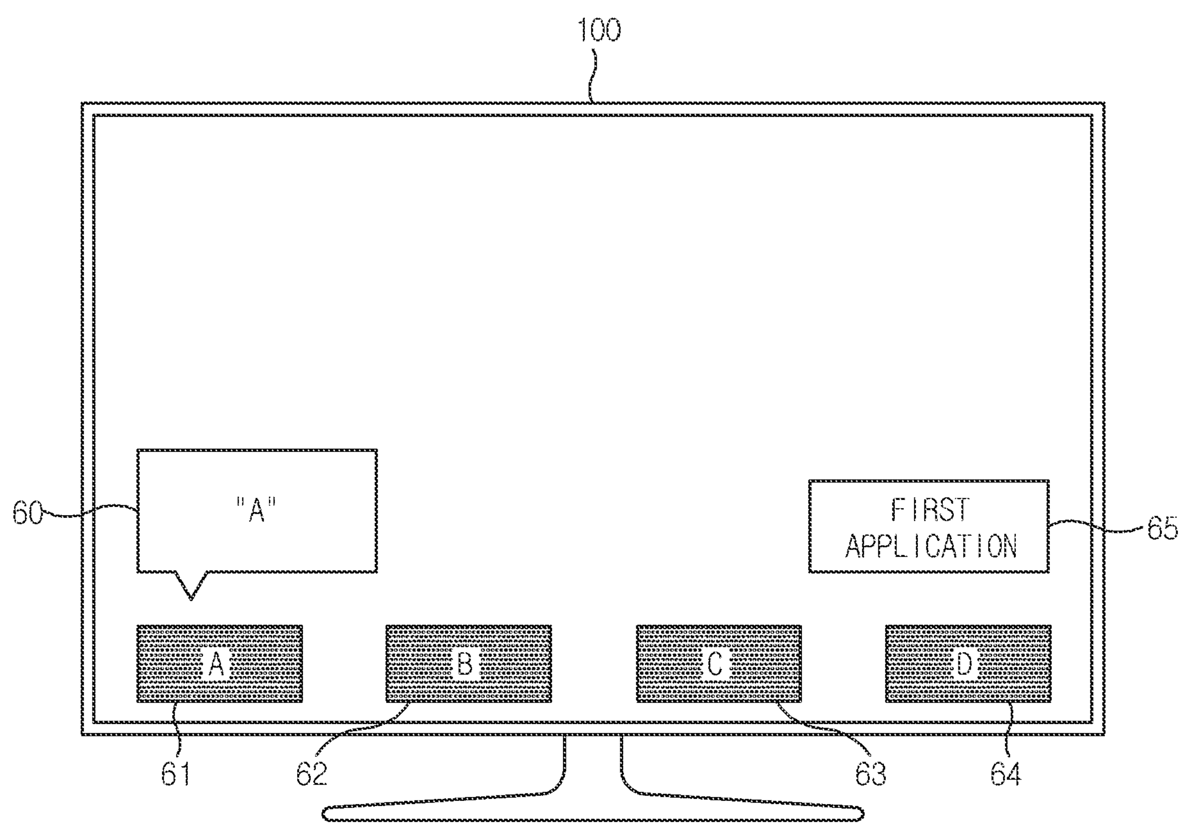
FIG. 4 illustrates an example of a screen which is displayed as a result of the voice recognition in FIG. 3.

FIG. 3 illustrates an example of performing voice recognition, and FIG. 4 illustrates an example of a screen that displays voice recognition results in FIG. 3.

As shown in FIG. 3, the display apparatus 100 may have registered candidate instruction words, which are provided by at least one application (including native application and dev. Application) and stored in the instruction word table 171.

For example, instruction words A and B are transmitted by the first application 172 (i.e., native application) to the instruction word table 171 (501), and are stored in the instruction word table 171 (502). The voice recognition engine 181 registers the instruction words A and B stored in the instruction word table 171 as candidate instruction words (504).

Instruction words C and D are transmitted by the third application 372 (i.e., dev. Application) to the instruction word table 171 (505), and are stored in the instruction word table 171 (506). The voice recognition engine 181 registers the instruction words C and D stored in the instruction word table 171 as the candidate instruction words (508).

Accordingly, the voice recognition engine 181 registers the instruction words A, B, C and D which are transmitted by the first and third applications 172 and 372 as candidate instruction words.

For example, when the instruction words A, B, C and D are registered as the candidate instruction words, an input of a voice A to the second voice acquiring unit 240 separated from the display apparatus 100 may be detected. The detected voice A is converted into a voice signal by the second voice converter 250, and transmitted to the voice recognition engine 181 through the second and first communication units 260 and 160 (509).

The voice recognition engine 181 compares the voice signal of the voice A with the registered candidate instruction words A, B, C and D, decides identical or similar commands, and recognizes the voice A (510).

The first controller 180 may transmit the recognition results to the display unit 130 (511), and the display unit 130 may display the voice recognition results as in FIG. 4.

As shown in FIG. 4, the display unit 130 may display a UI showing a voice recognition result "A" 60, and the candidate instruction words A, B, C and D 61, 62, 63 and 64 according to the voice recognition results. The display unit 130 may further display a UI showing application information (the first application) 65 managing the instruction word A according to the voice recognition results.

Through the UI displayed on a screen, a user may check the voice recognition results and the candidate instruction words. If the voice recognition results do not meet his/her intention of speaking, the user may select one of the candidate instruction words. The user may obtain information of an apparatus related to the voice recognition results through the application information.

The first controller 180 transmits a control command to the first application 172 according to the voice recognition results as in FIG. 3 (512). The first application 172 performs a control operation according to the recognized voice A by a control of the first controller 180. For example, if the voice A is "volume down", the volume of the display apparatus 100 is lowered.

As described in FIGS. 3 and 4, the display apparatus 100 may register the instruction words (e.g., A, B, C and D) of some applications in advance, and if a user's voice is detected, may recognize the voice, display the voice recognition results, and perform a corresponding control operation based on the registered candidate instruction words.

Although FIGS. 3 and 4 illustrate the instruction words of the first application 172 and the third application 372 which are registered as the candidate instruction words, and a user's voice is input through the second voice acquiring unit 240, the exemplary embodiment is not limited thereto. For example, the instruction words may be transmitted by other various native and dev. applications to register/delete the candidate instruction words, and voice is input through various voice acquiring units.

Hereinafter, a voice recognition system which performs voice recognition according to another exemplary embodiment will be described in detail with reference to FIG. 5.

Figure 5:
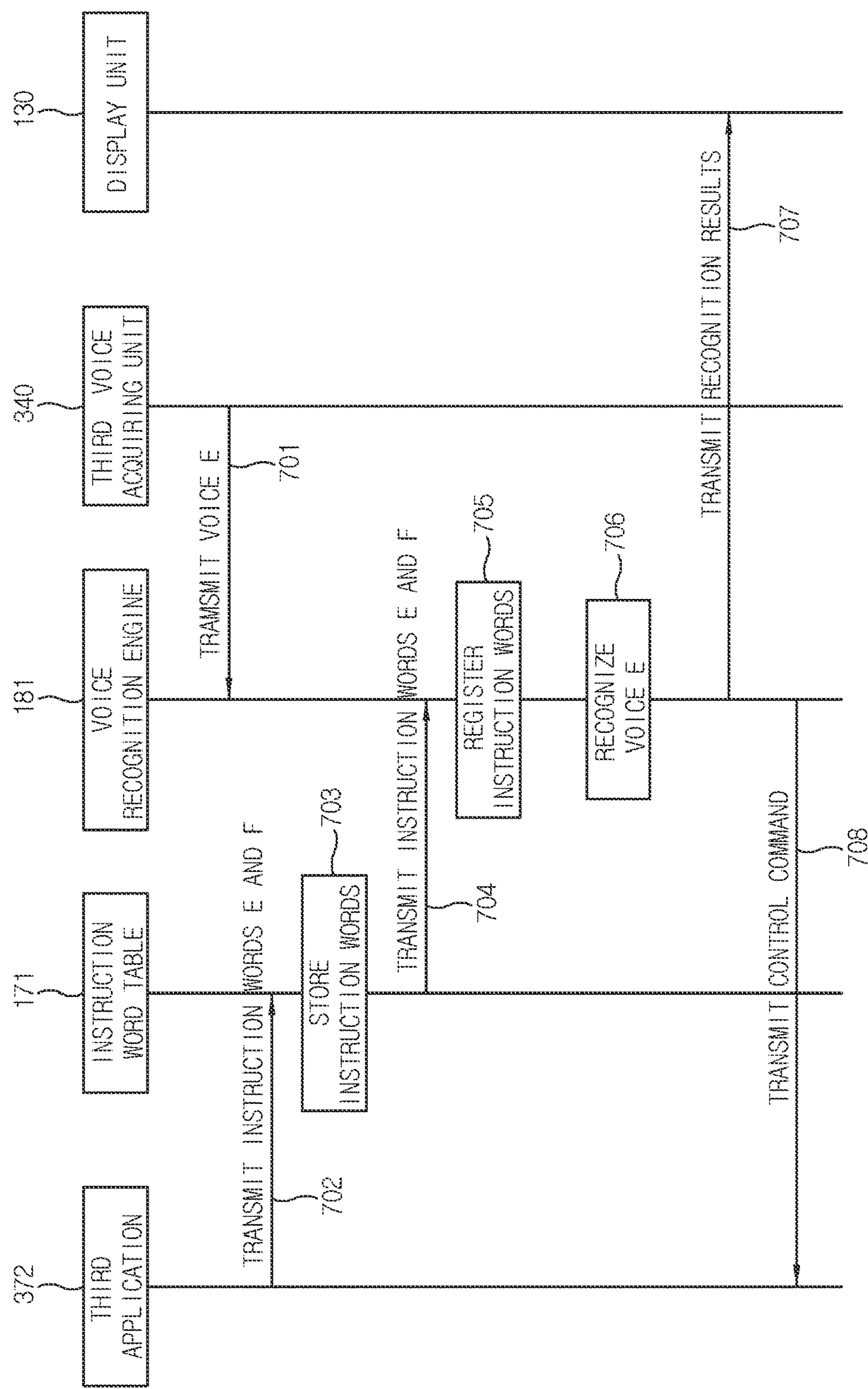
FIG. 5 illustrates an example of performance of voice recognition according to another exemplary embodiment.

FIG. 5 illustrates an example of performing voice recognition according to another exemplary embodiment.

As shown in FIG. 5, an input of a voice E to the third voice acquiring unit 340 that is separated from the display apparatus 100 may be detected. The detected voice E is converted into a voice signal by the third voice converter 350, and transmitted to the voice recognition engine 181 through the third and first communication units 360 and 160 (701).

The display apparatus 100 may have registered candidate instruction words. For example, instruction words E and F are transmitted by the third application 372 to the instruction word table 171 (702), and stored in the instruction word table 171 (703). The voice recognition engine 181 registers the instruction words E and F stored in the instruction word table 171 as candidate instruction words (705).

That is, the instruction words E and F which are transmitted by the third application 372 are registered as the candidate instruction words with the voice recognition engine 181.

When the instruction words E and F are registered as the candidate instruction words, the voice recognition engine 181 compares the voice signal of the voice E with the registered candidate instruction words E and F, decides identical or similar instruction words, and recognizes the voice E (706).

The first controller 180 transmits the recognition results to the display unit 130 (707), and the display unit 130 may display the voice recognition results.

The first controller 180 transmits a control command to the third application 372 according to the voice recognition results (708). The third application 372 performs a control operation according to the recognized voice E by a control of the third controller 380. If the control command transmitted according to the voice recognition results is a command for controlling the display apparatus 100, the control command may be transmitted to the first application 172 or the second application 173.

As shown in FIG. 5, if a user's voice is detected, the display apparatus 100 may register the instruction words (e.g. E and F) of the application corresponding to the apparatus to which the voice has been input, as the candidate instruction words, recognize the voice based on the registered candidate instruction words, display the voice recognition results, and perform a corresponding control operation.

Although FIG. 5 illustrates that a user's voice is input through the third voice acquiring unit 340, and the instruction words of the third application 372 are registered as the candidate instruction words, the exemplary embodiment is not limited thereto. For example, the voice may be input through various voice acquiring units, and instruction words may be transmitted by various native and dev. Applications to register/delete the candidate instruction words.

Hereinafter, a voice recognition method of the voice recognition system according to an exemplary embodiment will be described with accompanying drawings.

Figure 6:
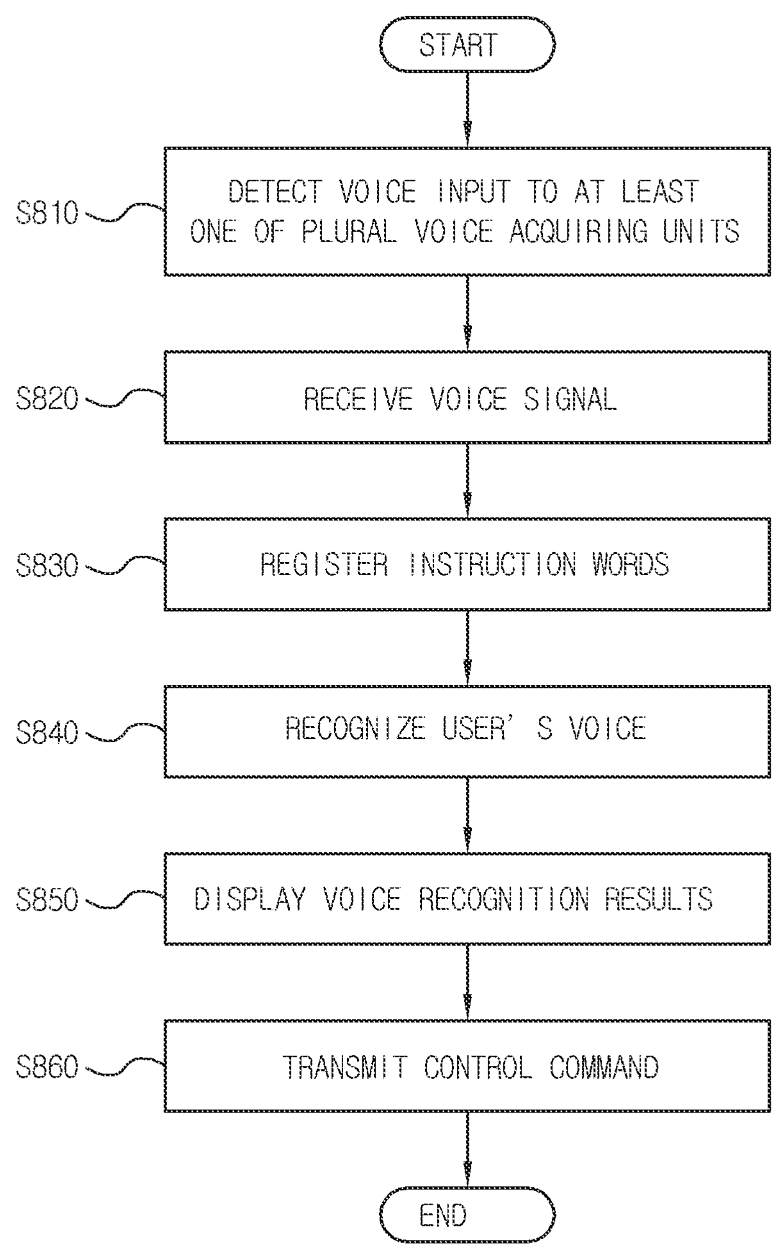
FIG. 6 is a flowchart showing a voice recognition method of the voice recognition system according to an exemplary embodiment.

FIG. 6 is a flowchart showing a voice recognition method of the voice recognition system according to the exemplary embodiment.

As shown in FIG. 6, the voice recognition system may detect the voice input to at least one of the plurality of voice acquiring units 140, 240 and 340 (operation S810). The detected voice is converted into an electric voice signal by the voice converters 150, 250 and 350.

The first controller 180 receives the voice signal (operation S820). If the voice input to the external voice acquiring units 240 and 340 is detected, the voice signal may be received through the first communication unit 160.

The voice recognition engine 181 registers the candidate instruction words to recognize the voice based on the voice signal (operation S830). The registered candidate instruction words may be the words stored in advance in the instruction word table 171, or received through the native or dev. applications 172, 173, 372 and 472, and stored in the instruction word table 171.

The voice recognition engine 181 recognizes the user's voice based on the stored candidate instruction words (operation S840).

The first controller 180 displays the voice recognition results on the display unit 130. The display unit 130 may display the voice recognition results for the voice signal, the candidate instruction words according to the voice recognition results, and the application information.

The first controller 180 generates a control command according to the voice recognition results and transmits the control command to the application (operation S860). Accordingly, the operation may be performed by the generated control command.

Figure 7:
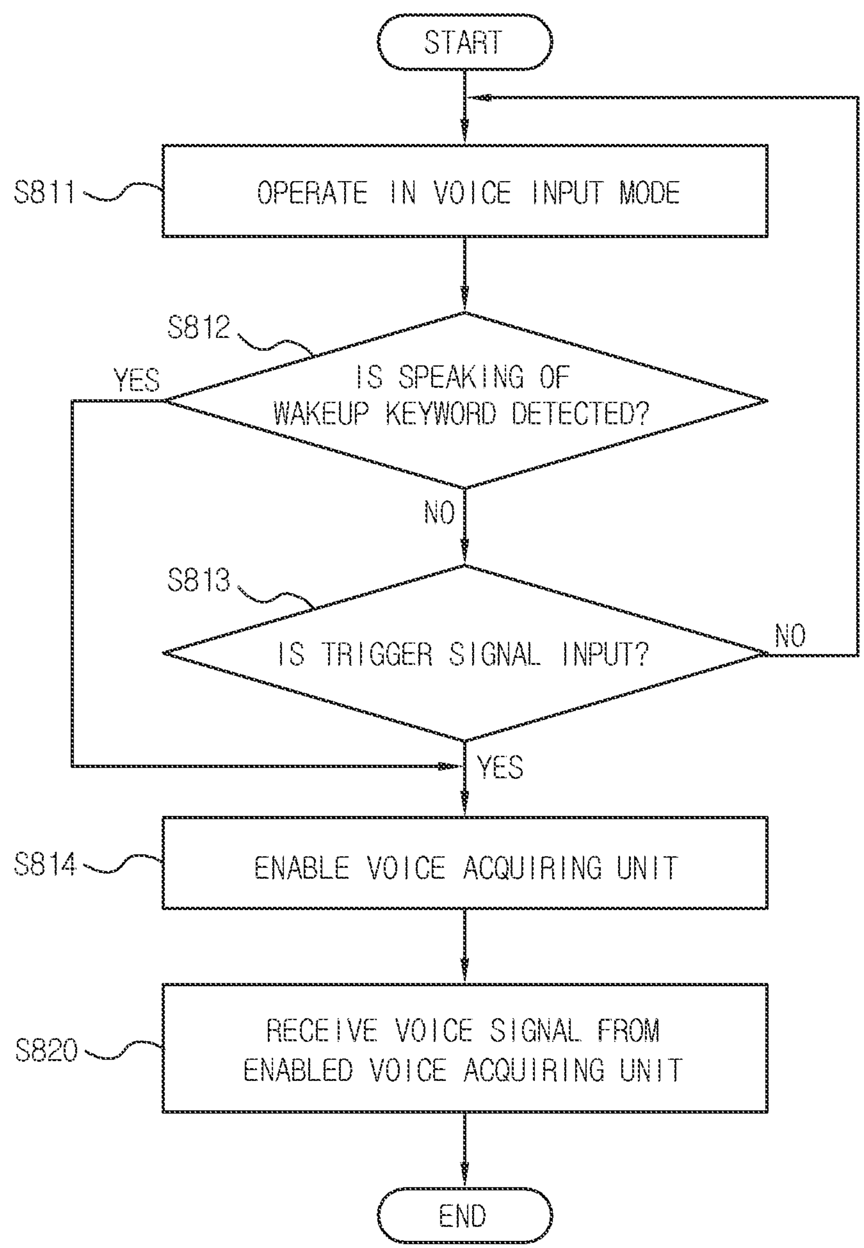
FIG. 7 is a flowchart showing details of a process of detecting a voice input in FIG. 6.

FIG. 7 is a flowchart showing details of a process of detecting a voice input in FIG. 6.

As shown in FIG. 7, the display apparatus 100 as the main apparatus may operate in a voice input mode in which a user's voice input is possible (operation S811). In the voice input mode, the voice may be input through various voice acquiring units 140, 240 and 340.

For example, the first controller 180 may detect a speaking of a wakeup keyword from one of the plurality of voice acquiring units 140, 240 and 340 (operation S812). The wakeup keyword enables the voice input through a particular voice acquiring unit, and may be set in advance. For example, the first voice acquiring unit 140 of the display apparatus 100 may set voice related to a control of TV such as channels and volume, etc., as the wakeup keyword. The second voice acquiring unit 240 of the mobile phone 200 may set voice related to call, contact information, etc., as the wakeup keyword.

Alternatively, if a trigger signal is input by one of the plurality of voice acquiring units 140, 240 and 340 as a result of a manipulation of a predetermined button (voice input button), the first controller 180 may detect the voice input by the voice acquiring unit (operation S813). For example, if a user manipulates the voice input button provided in a particular voice acquiring apparatus, the voice input to the voice input unit of the particular voice acquiring apparatus is detected.

According to the detection, the first controller 180 enables one of the plurality of voice acquiring units 140, 240 and 340 to which the voice is input (operation S812). As one of the voice acquiring units is enabled, detection of unnecessary voice and malfunction may be prevented.

The voice signal is transmitted by the enabled voice acquiring unit to the voice recognition engine 181 to perform voice recognition.

Figure 8:
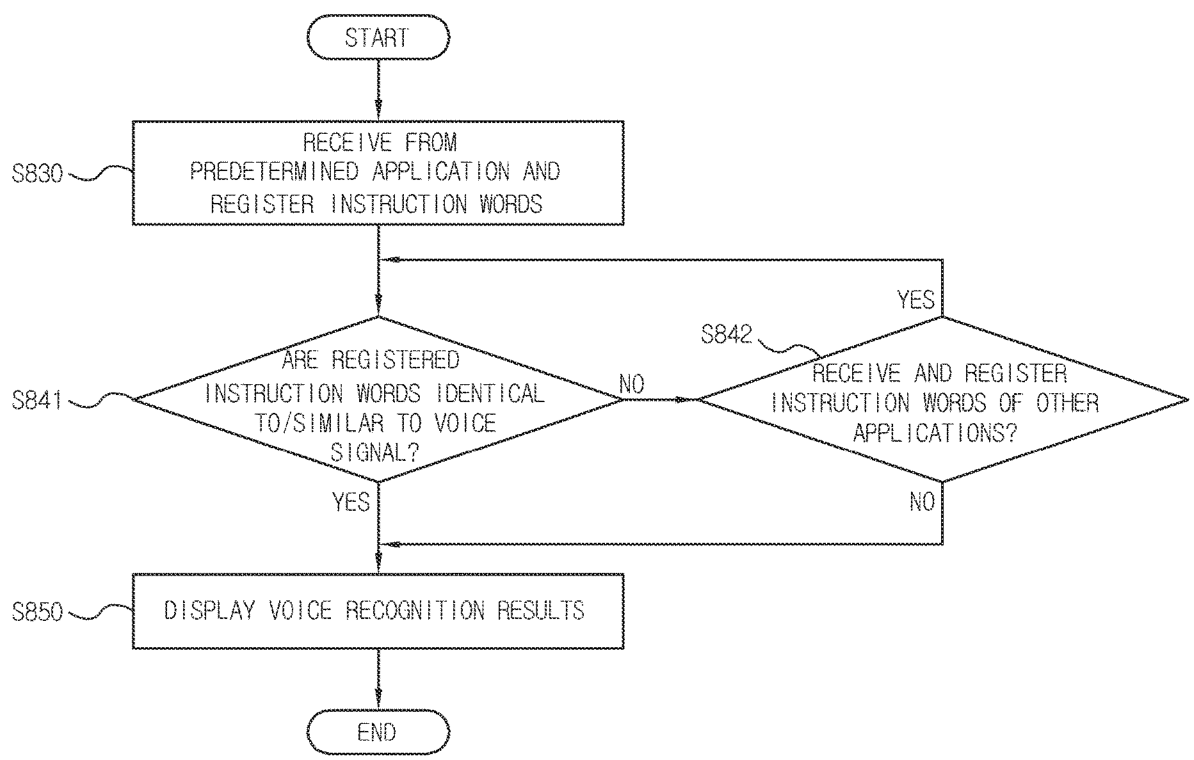
FIG. 8 is a flowchart showing details of a process of performing voice recognition in FIG. 6.

FIG. 8 is a flowchart showing details of a process of performing voice recognition in FIG. 6.

As shown in FIG. 8, the voice recognition engine 181 may receive candidate instruction words from at least one of the plurality of applications 172, 173, 372 and 472, and register the candidate instruction words (operation S830).

The voice recognition engine 181 may determine whether the registered candidate instruction words are identical to/similar to the received voice signal (operation S841).

If it is determined that there are identical or similar candidate instruction words, the voice recognition engine 181 decides the identical/similar instruction words and performs voice recognition, and the first controller 180 displays the voice recognition results on the display unit 130 (operation S850).

If it is determined that there is no identical or similar candidate instruction words, the voice recognition engine 181 may decide whether to receive and register the candidate instruction words of other applications (operation S842). The first controller 180 may receive and register the candidate instruction words of other applications according to a user's selection or an input, and may receive and register the candidate instruction words of the plurality of applications in a preset order. In consideration of the capacity of the first storage unit 170 of the display apparatus 100, the previous registered candidate instruction words may be selectively deleted.

That is, if no candidate instruction word is identical to/similar to the registered candidate instruction words, the operations S842 and S841 are sequentially performed to perform voice recognition.

If it is decided at operation S842 not to receive and register the candidate instruction words of other applications, the voice recognition engine 181 suspends the voice recognition, and the first controller 180 may display the failure to voice recognition on the display unit 130.

As the main apparatus according to the exemplary embodiment detects voices input by various apparatuses which receive a user's voice, various voice acquiring apparatuses may be used, and linked services may be provided by the voice acquiring apparatuses.

The candidate instruction words for voice recognition are transmitted by the plurality of applications, and registered/deleted. Thus, the candidate instruction words of the main apparatus are not unnecessarily increased, delay in the processing speed or deterioration of the rate of recognition may be prevented, and the overall efficiency of the voice recognition system may be improved.

The voice recognition results, the candidate instruction words, application information as well as information on various voice acquiring apparatuses, and apparatuses providing candidate instruction words used for voice recognition are recognized more easily by a user and user's convenience is enhanced.

While not restricted thereto, the exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Also, the exemplary embodiments may be written as computer programs transmitted over a computer-readable transmission medium, such as a carrier wave, and received and implemented in general-use digital computers that execute the programs. Moreover, while not required in all aspects, one or more units of the apparatus can include a processor or microprocessor executing a computer program stored in a computer-readable medium, such as a local storage.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus, comprising:

a display;

a voice receiver;

a first communication unit configured to communicate with a first external apparatus including a first external voice receiver; and a processor configured to:

in response to a trigger signal for activating a first voice recognition function being received from the first external apparatus via the first communication unit, activate the first voice recognition function using the first external voice receiver, and prevent an internal voice recognition function using the voice receiver, the first voice recognition function corresponding to the first external apparatus; and in response to the trigger signal stopping being received from the first external apparatus, enable the internal voice recognition function using the voice receiver.

2. The display apparatus according to claim 1, wherein the preventing the internal voice recognition function using the voice receiver disables the internal voice recognition function.

3. The display apparatus according to claim 1, wherein the preventing the internal voice recognition function using the voice receiver disables the voice receiver.

4. The display apparatus according to claim 1, further comprising:

a second communication unit configured to communicate with a second external apparatus including a second external voice receiver, wherein the processor is further configured to:

based on the trigger signal from the first external apparatus being received via the first communication unit, prevent a second voice recognition function, using the second external voice receiver, corresponding to the second external apparatus; and based on the trigger signal from the first external apparatus stopping being received, enable the second voice recognition function using the second external voice receiver.

5. The display apparatus according to claim 4, wherein the first communication unit includes a Bluetooth module, and the second communication unit includes a wireless local-area network (LAN) module.

6. The display apparatus according to claim 1, wherein the processor is further configured to:
based on a user voice input received through the voice receiver corresponding to a trigger word, enable the internal voice recognition function using the voice receiver.

7. The display apparatus according to claim 6, wherein the processor is further configured to:
based on the user voice input received through the voice receiver corresponding to the trigger word, prevent the first voice recognition function, using the first external voice receiver, corresponding to the first external apparatus.

8. The display apparatus according to claim 1, further comprising:
a second communication unit configured to communicate with a second external apparatus,
wherein the processor is further configured to:
obtain a result from at least one of the first voice recognition function and the internal voice recognition function, the result corresponding to an operating function of the second external apparatus; and
transmit, to the second external apparatus via the second communication unit, a control signal corresponding to the operating function of the second external apparatus, causing the second external apparatus to perform the operating function.

9. The display apparatus according to claim 1, wherein the processor is further configured to:
control the display to display a user interface (UI) corresponding to the activated first voice recognition function.

10. The display apparatus according to claim 1, further comprising:
a signal receiver,
wherein the processor is further configured to:
receive an image signal through the signal receiver,
process the received image signal, and
control the display to display an image corresponding to the processed image signal.

11. A method for controlling a display apparatus, the method comprising:
in response to a trigger signal for activating a first voice recognition function being received from a first external apparatus including a first external voice receiver via a first communication unit, activating the first voice recognition function using the first external voice receiver, and preventing an internal voice recognition function using an internal voice receiver, the first voice recognition function corresponding to the first external apparatus; and
in response to the trigger signal stopping being received from the first external apparatus, enabling the internal voice recognition function using the internal voice receiver.

12. The method according to claim 11, wherein the preventing the internal voice recognition function using the internal voice receiver comprises disabling the internal voice recognition function.

13. The method according to claim 11, wherein the preventing the internal voice recognition function using the internal voice receiver comprises disabling the internal voice receiver.

14. The method according to claim 11, further comprising:
based on the trigger signal from the first external apparatus being received via the first communication unit, preventing a second voice recognition function, using a second external voice receiver, corresponding to a second external apparatus including the second external voice receiver; and
based on the trigger signal from the first external apparatus stopping being received, enabling the second voice recognition function using the second external voice receiver.

15. The method according to claim 14, wherein the display apparatus further comprises a second communication unit configured to communicate with the second external apparatus, and
wherein the first communication unit includes a Bluetooth module, and the second communication unit includes a wireless local-area network (LAN) module.

16. The method according to claim 11, further comprising:
based on a user voice input received through the internal voice receiver corresponding to a trigger word, enabling the internal voice recognition function using the internal voice receiver.

17. The method according to claim 16, further comprising:
based on the user voice input received through the internal voice receiver corresponding to the trigger word, preventing the first voice recognition function, using the first external voice receiver, corresponding to the first external apparatus.

18. The method according to claim 11, further comprising:
obtaining a result from at least one of the first voice recognition function and the internal voice recognition function, the result corresponding to an operating function of a second external apparatus; and
transmitting, to the second external apparatus via a second communication unit, a control signal corresponding to the operating function of the second external apparatus, causing the second external apparatus to perform the operating function.

19. The method according to claim 11, further comprising:
controlling a display to display a user interface (UI) corresponding to the activated first voice recognition function.

20. The method according to claim 11, further comprising:
receiving an image signal through a signal receiver,
processing the received image signal, and
controlling a display to display an image corresponding to the processed image signal.

* * * * *